July 7, 1942.   L. R. WILLITS   2,288,984
BATTERY ALARM
Filed Aug. 12, 1939   2 Sheets-Sheet 1
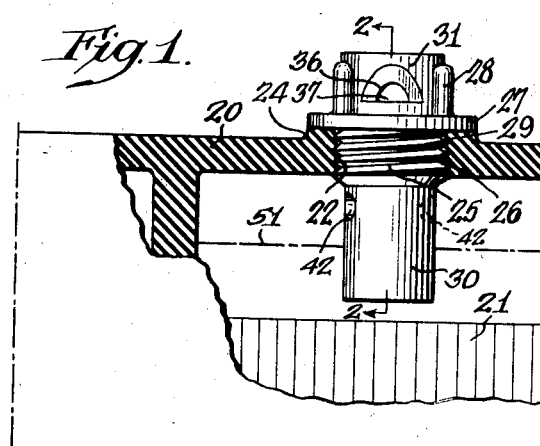
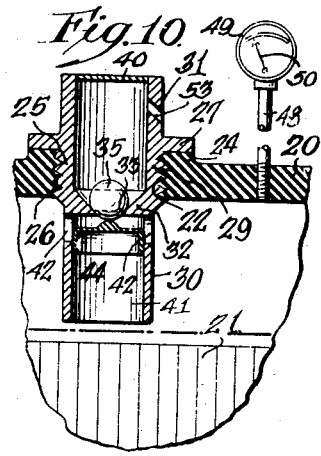
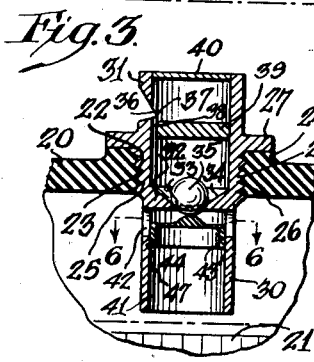
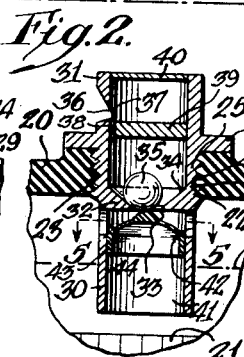
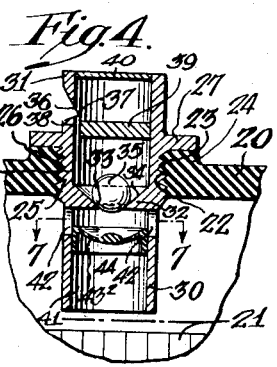
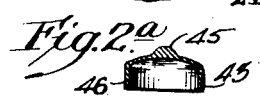
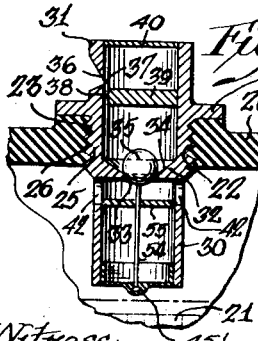
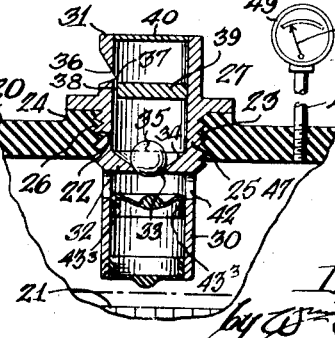
Inventor
Leland R. Willits
Attorneys July 7, 1942.    L. R. WILLITS    2,288,984
BATTERY ALARM
Filed Aug. 12, 1939    2 Sheets-Sheet 2
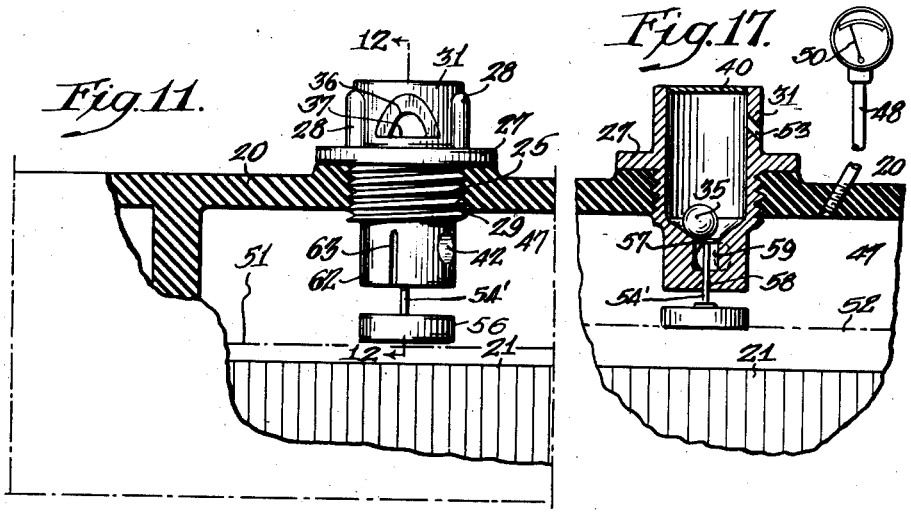
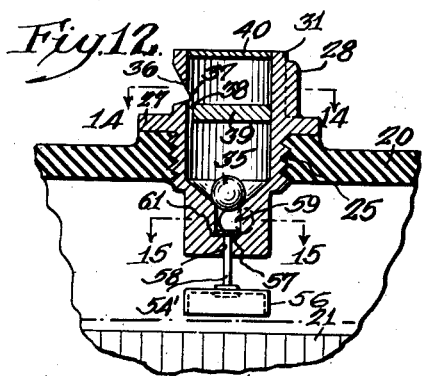
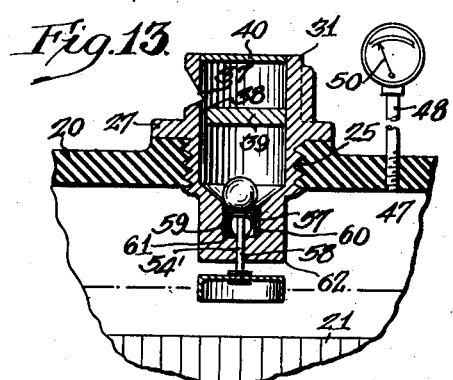
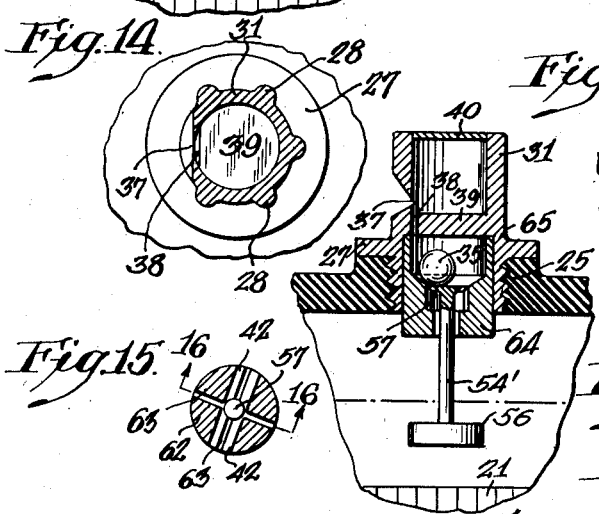
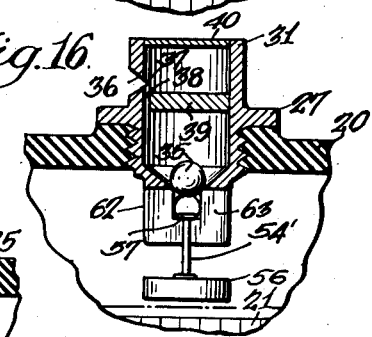
Inventor
Leland R. Willits
Attorneys.

Patented July 7, 1942

2,288,984

UNITED STATES PATENT OFFICE 2,288,984

BATTERY ALARM

Leland Ross Willits, Atlantic City, N. J., assignor, by mesne assignments, to Edw. K. Tryon Company, a corporation Application August 12, 1939, Serial No. 289,937

15 Claims. (Cl. 136—182)

My invention relates to fluid-pressure actuated signals for secondary battery use, operating automatically during charging of the battery in the event of serious depletion of the electrolyte and either overcharging or excessive rate of charging to warn of the existing conditions.

A purpose of the invention is to operate an alarm, preferably an audible alarm, by fluid pressure during battery overcharging or excessive charging if and when the battery electrolyte has lowered excessively or has otherwise deteriorated beyond a predetermined limit.

A further purpose is to operate a warning signal, to show battery and battery charging conditions by gases liberated from the surface of the electrolyte during charging. The deterioration may be evidenced by low level or low specific gravity of the electrolyte.

A further purpose is to use an accumulated condition of battery deterioration to close an otherwise open battery vent and to use the pressure of gases then accumulating during battery overcharging or excessive rate of charging to give warning of the fact.

A further purpose is normally to use the buoyancy of an elecrolyte to hold open a check valve in the path of a battery vent so that gas liberated during overcharging or excessive rate of charging can escape freely through the vent and so that decrease of buoyancy incident to electrolyte deterioration permits the check valve to close and to use intermittent accumulations of pressure when the valve is closed to operate a signal. The buoyancy of the electrolyte can be transmitted through a pressure chamber and diaphragm or through a float and connections.

A further purpose is to energize a fluid-operated signal at low electrolyte levels and or under low electrolyte specific gravity conditions through gas liberation from the electrolyte during overcharging or excessive rate of charging and automatically to render the signal inoperative when the level and specific gravity are both at or above predetermined safe levels.

A further purpose is to unseat a gravity-actuated check valve through variation in the height or specific gravity of an electrolyte and with low electrolyte level or low specific gravity to permit seating of the check valve and, subsequently, during battery overcharging or charging at an excessive rate, to trap gas released from the electrolyte until the pressure above the electrolyte lifts the valve and allows the accumulated gas to pass through it. I thus provide a pressure-operated signal which does not operate during normal discharge of gas through the lifted valve but uses the blast for an audible signal or the pressure before the blast in a visual signal.

A further purpose is to provide a pressure-operated signal such as a whistle and a fluid connection between it and a battery, closed by a gravity-operated check valve, in which at intervals if the valve be closed accumulating pressure will blow off through the valve, but in which the valve is unseated by the lifting power of the electrolyte when the condition of the latter is normal. The unseating of the valve may be effected either by float means or by the pressure of a fluid column made effective by submergence of the mechanism in an electrolyte. The signal may be operated by the rise of pressure before the valve is unseated or, as in the case of an audible signal such as the whistle, by the puff of gas when the valve lifts.

A further purpose is to operate a signal by gas or vapor liberated from the surface of an electrolyte during battery overcharging or excessive rate of charging when the condition of the electrolyte is abnormal and to use the lifting power due to normal level and normal specific gravity of the liquid to render the signal inoperative.

A further purpose is to raise the pressure of air in a signal-operating tube by submergence of the tube and to use this pressure through a diaphragm to open a trap valve.

Further purposes will appear in the specification and in the claims.

I have preferred to illustrate my invention by a few forms only, selecting forms which not only are practical, effective, inexpensive and highly successful but which well illustrate the principles of my invention.

Figure 1 is a fragmentary cross-section, partly in elevation, showing one form of my invention in place within a battery cell.

Figures 2, 3 and 4 are fragmentary vertical cross-sections of structure like or similar to that in Figure 1, taken in the positions of line 2—2 of Figure 1, but showing slightly different constructions.

Figures 2a, 3a and 4a are vertical sections of diaphragms and diaphragm supports seen, respectively, in Figures 2, 3 and 4.

Figures 5, 6 and 7 are sections of Figures 2, 3 and 4, respectively, taken upon lines 5—5, 6—6 and 7—7.

Figures 8, 9 and 10 are fragmentary sections corresponding generally to Figure 3 but showing further modified forms.

Figure 11 is a fragmentary section partly in elevation corresponding generally to Figure 1, but showing a different form.

Figures 12, 13 and 16 are fragmentary vertical central sections, 12 and 13 corresponding to the position of section line 12—12 in Figure 11, showing different positions of the parts.

Figure 13a is a vertical central section of a modified form.

Figures 14 and 15 are sections of Figure 12 taken upon lines 14—14 and 15—15 respectively.

Figure 17 is a fragmentary section corresponding generally to Figure 12 but showing a modified form.

Other applications are copending filed by me and identified as follows:

Alarm for battery, Ser. No. 289,936, filed August 12, 1939.

Diaphragm and support, Ser. No. 289,938, filed August 12, 1939.

In the drawings similar numerals indicate like parts.

In all secondary battery use it is important that the electrolyte be maintained in reasonably "full" supply and of at least a certain specific gravity which has been found by experience to represent good battery condition. The height to which the level of electrolyte should be maintained and the specific gravity below which it should not be allowed to deteriorate are very well known and well recognized and need no further discussion here.

Whether the electrolyte be high in the individual storage battery cell or low in the cell, and whatever its specific gravity, gas is given off from its surface during charging of the battery by an automobile generator when the battery is overcharged or is charged at an excessive rate. Notwithstanding that automatic means is supplied with most of the automobiles to prevent overcharging and to prevent charging at an excessive rate, a very large number of automobiles continue to give off gas freely during charging. This takes place whether the battery cell be full of electrolyte or nearly empty. The gas is largely, if not exclusively, hydrogen gas. It normally escapes from the cell without any attention being paid to it as in automobile service it is not used for any purpose.

The present invention is based upon recognition that with low electrolyte level in a cell and/or with low specific gravity, the gas given off during charging can be trapped intermittently so as, with overcharging or excessive rate of charging, successively to accumulate pressure of the gas beneath a pressure-released discharge closure to produce a gas-operated signal, preferably but not necessarily of audible type, and that higher level and/or higher specific gravity of the electrolyte may be used automatically to make this intermittent trapping ineffective or inoperative, during which inoperative condition the gas will pass out through the closure more or less continuously and will therefore not operate the signal.

Automatic inoperativeness of the trap when the electrolyte is of satisfactory height and specific gravity is accomplished in the illustrations through the buoyancy of the electrolyte, the lifting power of the electrolyte being transmitted to the trap valve through a trapped column of air and gas as in Figures 1 to 4, 8 and 10, by a float and thrust stem in Figures 11, 12, 13, 16 and 17, or by a submerged diaphragm and thrust stem as seen in Figure 9.

The pressure form of the invention is that seen in Figures 1 to 10, inclusive. In it the inoperativeness of the trap or closure is effected by reason of submergence of a tube in the electrolyte with consequent transmission of the internal pressure due to submergence to and against the trap, throwing the trap to inoperative position where the gas can pass out freely.

It will be noted that low electrolyte level directly affects the extent of submergence and hence the internal pressure available in the tube for lifting the ball of the trap to inoperative position and that low electrolyte specific gravity also affects the operation because the lower the specific gravity the less internal pressure there is in the tube for the same amount of submergence of the tube in the electrolyte.

In the float form of the invention, seen in Figures 11 to 17, inclusive, the lifting power of the float is dependent very directly upon the height of the electrolyte level and quite obviously is dependent upon the specific gravity of the electrolyte.

However little the float be submerged, the specific gravity of the electrolyte affects the height of the float and thus affects the liquid level at which connections from the float render the trap inoperative.

All of the figures except 10 and 17 show audible signals of a whistle type operated by puffs or tiny blasts of gas released when the ball of the trap is lifted. Figures 8 and 13 show dial operated signals indicating the accumulating pressures before the balls lift, and also whistle signals and Figures 10 and 17 show the dial type only.

It will be noted that there is no inconsistency in the use of both the audible signal and the visible signal in the same cell during the same period of time. The visual signal operates during the accumulation of pressure and then drops to its zero reading when the ball lifts. The audible signal is not operated until after the ball lifts. The two signals therefore operate at different times in the cycle of pressure accumulation and relief and are operated by different phases of the cycle.

The pressure indicator form is shown here to illustrate the breadth of the invention. Either submergence pressure control or float control may be used to render the trap inoperative in this visual form of Figures 8, 10, 13 and 17 as the pressure indicator is effective when the trap ball intermittently closes the valve opening without regard to the means by which the trap is at other times rendered inoperative.

In all forms the upper battery wall 20, plates 21 and filling opening 22, threaded at 23 of an individual cell of a battery are intended to be typical and to represent a considerable variety of constructions for the purposes indicated. Flange 24 surrounds the opening.

In place of the filling cap I place my signaling device 25. Because the battery opening normally is threaded the body of the signaling device is shown as threaded at 26 to fit into the thread. The body is flanged at 27 to engage the flange 24 about the opening. The upper part of the signaling device is ribbed at 28 for roughening purposes in order that the signal may be screwed into place readily.

For convenience the signal may be considered as made up of three main parts, the body 29, the operating end 30, by which variations in electrolyte level are made effective, and the indicating end 31 by which sound is produced.

The signaling device is shown in Figures 2, 3, 4, 8 and 9 as tubular, having upper whistle sections and lower immersible tubes separated by a partition 32 which is closed except for an opening within valve seat 33. The upper surfaces approaching the valve seat are tapered at 34 so as to guide toward the seat a gravity-operated trap closure 35 in the form of a ball. All of the parts, including the closure are made of a material such as Bakelite, hard rubber or glass which is not affected by the battery electrolyte. The closure must properly close the valve opening, that the weight and valve exposure shall be related so that the gas pressure will lift the ball and that before lifting the ball the gas pressure beneath it shall be raised enough for the subsequent puff through the trap opening to blow the signal. The ball is of course directly in the line of discharge of gases from the electrolyte and these gases carry over with them some of the acid of the electrolyte, tending to form a film of electrolyte upon and about the ball.

I have had considerable success using hard rubber for the casing and a glass ball which has been ground to spherical shape.

The permissible weight for the ball will vary with the extent of variation of electrolyte level and specific gravity to which the ball is intended to respond, i. e., the amount of variation in pressure needed between closure of the valve by the ball and effective inoperativeness of the ball for closure purposes, and also upon the sensitiveness of the audible indicator. I have used successfully balls of 9/36" diameter weighing .032 gram each and valve openings of approximately three-sixteenths of an inch diameter.

In all of the forms of Figures 1 to 9 an audible fluid-pressure-actuated indicator is used, shown in the form of a whistle having the whistle outlet opening at 36 and its effective edge at 37.

In order that the discharge of fluid (largely if not wholly hydrogen gas) through the valve opening may be effective to operate the whistle, this discharge is directed against the whistle edge by walls of a passage 38 secured by use of a partition in the form of a washer 39 which is flatted at the edge defining one side of the passage. The top of the upper section is closed by a disc 40. These various items of structure are of course merely convenient details of manufacture of a device which obviously could be made up in various ways.

The lower tubular section is intended in Figures 1 to 7 to be open at the bottom at 41 and at the upper end close to the partition at 42, 42. Just below the openings 42, 42 I apply a diaphragm 43 which, in the absence of pressure above atmospheric pressure in the compartment 44 beneath the diaphragm, rests out of contact with or barely against the ball 35 so that when the lower open end 41 is above the electrolyte or is so little immersed in the electrolyte as not to cause effective increase of pressure within the compartment 44, the ball 35 rests in its valve closing or trap position as seen in Figures 3 and 4; but when any considerable pressure is exerted within the compartment 44 by immersion of any predetermined height for which the delicacy of the instrument is suited, the pressure within the compartment 44 will cause the diaphragm to lift and to engage and unseat the ball, as seen in the unseated ball position of Figure 2.

Three slightly different diaphragms (membranes), 43, 43', 43$^2$, are shown in the figures. In the form best known to me the membrane is made of a very pure form of latex rubber without any reclaimed rubber or filler content. The membrane comprises a very thin film which has been made and used successfully in as thin a sheet as three thousandths of an inch thick. In Figures 2 and 2a the diaphragm 43 is initially upwardly convexed and is so thin that the very slight pressures below it are capable of stretching the rubber and thus lifting the closure or trap, i. e. the ball of the illustration. It is of course not necessary that the rubber be stretched as the adjustment of the position of the diaphragm may be such that the diaphragm need be lifted merely (without stretching) to lift the ball. The middle part of the membrane may be bulged or swelled in the form of a lump or nub 45 which takes the wear and distributes the pressure due to contact with the ball. This is especially desirable where the membrane is quite thin. This nub has been made of pure rubber integral with the membrane and also in other structures has been attached to it. In Figure 2 it is integral with the membrane.

In Figures 3 and 3a the diaphragm 43' lies approximately in a plane and is capable of being lifted with little or no stretching so as likewise to render the ball ineffective as a closure. The lump here is attached to the diaphragm membrane.

In the form shown in Figures 4 and 4a, which is my preferred form, the diaphragm 43$^2$ is upwardly concave and no stretching but merely slight lifting of the diaphragm membrane is needed to bring the diaphragm through its integral lump into engagement with the lower end of the ball of the trap and then to lift the ball. It is the preferred form because it makes little difference whether it be extremely thin or merely quite pliable so as easily to be lifted and capable of a long series of uses without objectionable fatigue of the material. There is no stretching of the rubber. Though it may be very much thicker than any form which would require stretching of the rubber it works well and with great delicacy when the membrane is quite thin.

In other words the limits to the thickness of the transverse diaphragm wall are that it shall be strong enough for continued use, must not give undue weight nor undue stiffness and must respond to the very delicate variations in pressure provided by an electrolyte level higher outside than the level of the electrolyte within the lower compartment. These differences in pressure within the lower compartment are slight even between an electrolyte level which does not close the bottom of the compartment and one providing maximum extent of immersion.

Where it is the thought that the signal is to respond to differences in specific gravity of the electrolyte an even more delicate membrane is called for than where the difference in height of the electrolyte is wholly depended upon.

The thickening of the diaphragm to add the lump has been found in practice not to add enough weight to make it objectionable.

The diaphragm membrane is held in place in the illustrations by a support 46 shown as of ring form and held in place by the expanding pressure of the ring against the interior wall 47 of the operating part, that is the interior wall of the tubular lower section of the signal.

Because rubber is free from injury by the electrolyte and because of the excellence of its expanding frictional engagement as a means of holding the ring within the tubular lower part of the signal when compressed against the inner wall the ring support has also been made of pure rubber with excellent results. In some of my diaphragms the membrane has been integral with the ring. In other forms it has been fastened by a rubber cement across the top of the ring. An extremely thin membrane has been secured with the desirable fullness and integral with the ring by casting. Any extent of convexity or concavity can thus be had with membranes but a few thousandths of an inch thick. There is no definite requirement regarding the cross section of the ring. I have used a cross-section of approximately $\frac{3}{32}$ of an inch in axial length and a little less than $\frac{1}{16}$ of an inch thick.

With a diaphragm of the character indicated slightly larger than the interior diameter of the tubular lower section the ring is pressed into position and can readily be placed at the exact height desired. Though after proper spacing no movement is needed it can be adjusted readily to different heights.

The rubber of the diaphragm and ring degenerate of course when there is excess of oxygen from the air. In the present situation they are protected from this because the gas given off by the electrolyte while the battery is being charged carries with it acid from the electrolyte itself and this discharge takes place within the lower compartment as well as outside of the lower compartment. A layer of condensed vapor forms on the diaphragm and on its support except in so far as the collar or sleeve is protected from this layer by engagement with the interior walls of the compartment. This protects substantially the entire diaphragm and support from attack by oxygen.

In Figure 8 the interior space of the lower compartment has been closed at the top by a diaphragm $43^3$ which may be of the general character seen in Figures 4 and 4a but lifted toward contact with the ball trap, and has been closed at the bottom by a diaphragm of the same general type but inserted upside down. Insertion of the second diaphragm slightly compresses the column of air, in the compartment 44, and presses the lower membrane so that it is convexed outwardly (downwardly) at the bottom. As a result even without immersion sufficient pressure has been provided thus within the compartment to lift the upper diaphragm to a desired extent; for example, just into engagement with the ball. I have found this form very delicate as even slight immersion of the device within the electrolyte lifts the lower diaphragm sufficiently to lift the ball, and there are no such fluctuations in the position of the upper diaphragm as would take place with the upper diaphragm alone when, for example, the electrolyte splashes across the cell, sometimes immersing the compartment quite appreciably and at the other times allowing access of air or gas to the lower end of the compartment.

In this form of Figure 8 I have illustrated also another application of my invention, a visual signal shown for illustrative purposes, which is capable of use in connection with any of my other forms; also whether these other forms have or do not have an audible signal such as the whistle shown. Only the cell space 47 above the electrolyte is connected by any suitable conduit 48 with a very delicate pressure indicator 49 which may be located on an automobile dash board or at any other convenient point, the purpose being to cause variation in the position of indicating needle 50 according to variations in pressure within the cell.

In operation, with the audible forms Figures 1-7, the electrolyte normally should occupy a height corresponding generally with line 51 in Figure 1. At this height the level of the electrolyte within the open lower tubular ends will be approximately as seen at 52 in Figure 2 and the pressure within, where the upper diaphragm only is used, will be represented by the weight of a column of electrolyte having the difference in levels as its height. In the Figure 8 form a corresponding pressure will tend to lift the lower diaphragm.

The pressure will be sufficient to lift the upper diaphragm in any of the forms and thus to lift the ball of the trap, making the trap inoperative as such. While the ball of the trap is lifted gas liberated from the electrolyte during charging will pass out through the valve opening as liberated at approximately uniform speed and without accumulating any appreciable pressure within the cell. The signaling devices, whatever the form, shown in Figures 1 to 10 will not operate under these conditions because the rate of release of the gas is too low for their operation.

When the level of the electrolyte lowers or when the specific gravity of the electrolyte and the electrolyte level together lower sufficiently so that the pressure due to the difference in electrolyte heights outside and inside, viewed as a pressure column will not longer hold the ball from its seat the trap will close and continued passage of the gas generated in the electrolyte and liberated at its surface will be cut off. The gas generated will then begin to accumulate pressure within the cell. The amount of this pressure before the ball is lifted is determined by the diameter of the valve opening and the weight of the ball. The material of the ball will of course enter into this feature of the design. Ground glass is preferred.

Each time when the pressure accumulates sufficiently and the ball is lifted the pressure reduces approximately to atmospheric pressure. The puff of hydrogen gas through the valve opening blows the whistle and at the same time lowers the pressure, completing a cycle. The operation then begins all over again.

In the form shown in Figure 10 there is no whistle and correspondingly there is no need of partition 39. There is an outlet 53, however, so as to permit discharge to the atmosphere of the normal gas as liberated and the successive charges of gas as they lift the ball. In this form the signal is given by the pressure transmitted through conduit 48 to indicator 49 and shown by indicator needle 50, as alternatively seen in Figure 8. In Figure 10 this is the only form.

The Figure 8 indicator at the dash and the Figure 10 indicator at the dash operate because of the same principle, intermittent accumulation of pressure and intermediate release of pressure as in the other figures, are made effective by any of the other constructions shown, and are made inoperative by any of the means illustrated but operate at a different part of the cycle. When the ball is lifted and the gas is free to exhaust at uniform speed there is no appreciable accumulation of pressure within the cell space 47 above the electrolyte but when the trap closes and pressure accumulates within the cell space 47, this pressure causes an increasing swing of the needle 50 up to the time when lifting of the ball allows the pressure to drop again to approximately atmospheric pressure.

The electrolyte cannot enter the compartment 44 in Figure 8, except to the extent that it upwardly presses the lower diaphragm into this space, and the extent of this upward extension of the lower diaphragm also measures the pressure which can be exerted upon the upper diaphragm, whatever the depth of immersion of the tube in the electrolyte.

In Figure 9 one diaphragm only is used, that being the lower diaphragm. It may have the diaphragm membrane at either end of its ring support. The electrolyte level is shown as low here and the diaphragm consequently is at a low position. In this form the thickening of the diaphragm at nub 45' is utilized to hold the lower end of a light stem 54 which is held against lateral displacement by a guide 55 frictionally supported within the upper part of compartment 44. It will be noted that here there is no trapping of air within this compartment and the guide 52 does not shut off passage of air at the open part of the compartment.

The stem 54 is used to lift the ball and so render the trap inoperative during such time as the level of the electrolyte is high enough to lift the diaphragm shown. By the use of a diaphragm which has to be lifted merely or one which must be stretched slightly in order to cause lifting of the ball, movement of the diaphragm can be very sensitive or can be damped to any extent desired. Damping can be graduated by correspondingly selecting the thickness of the diaphragm membrane or the extent to which it must be stretched so that the ball trap will not be rendered inoperative for every slight pressure of electrolyte upon the diaphragm but will be preset to operate upon a predetermined depth of electrolyte coverage of the lower end of the compartment 44.

The operation of the Figure 9 form is identical with air-cushion operation of the Figure 8 form except that the stem engaging the ball performs the function which in the Figure 8 is performed by the column of confined air and by the upper diaphragm in lifting the ball.

The form in Figures 11 to 17 employs a float 56 and a stem thrust member 54' instead of the pressure-operated diaphragm.

That which was a coned partition merely in Figures 1 to 10 guiding the ball valve into position within the seat is still the bottom of the upper compartment but there is no longer need of a compartment under it. This lower portion is therefore solid.

The float stem is capped at 57 and is guided along its sides as at 58. A recess is provided at 59 for travel of the cap of the stem. Grooves 60 provide for escape of the gas past the cap when the ball valve is not closed. A shoulder 61 limits downward movement of the cap, and hence the stem.

Openings 42, 42 admit gas from the upper part of the cell to the recess 59 which gas then passes through the trap.

In order additionally to admit gases to this space the lower part 62 is kerfed at 63.

Except for the use of the float and suitably guided stem (the devices used in Figures 11 to 17 instead of the fluid pressure ball-lifting connection of the earlier figures) the structures of Figures 11 to 17 operate the same as those in Figures 1 to 10. An auxiliary visual indicator is shown in Figure 13 corresponding in all particulars to that shown in Figure 8 and a similar visual indicator in Figure 17 forms the only indicator in this figure as is true of the indicator in Figure 10.

In Figure 13a the structure is slightly modified in order that the shell or casing may be split into two parts. The lower portion, including the valve seat and ball-guiding surface is included within a cup 64 frictionally supported within the signal body at 65.

In each of the forms of Figures 11 to 17 the trap is rendered inoperative during higher electrolyte levels and specific gravities; and when the level and/or specific gravity lowers sufficiently for the ball valve to seat intermittently there is the same gradual accumulation of pressure, shown on the visual indicator where one is used, up to the time when the pressure becomes sufficient to unseat the valve, and the same use of the gas which had been trapped beneath the valve in operation of the audible indicator—where one is used—as in these other figures.

It will be evident that my plug for the cell of a secondary battery will be screw-threaded if the opening is screw-threaded or otherwise will fit the opening; and that its upper portion is chambered and is closed at the top in order to make the discharge effective through the whistle. The valve opening and the whistle opening above the cell top are both outlet openings. The valve opening provides a passage for escape of gas from the interior of the cell, which communicates at the center with what is effective as a pocket.

In the forms of Figures 11 to 16 the float and stem actuation operate with predetermined level and/or specific gravity to lift the ball valve so that the valve opening will be unobstructed. The ball valve intermittently obstructs the escape means provided by the valve opening and forms a freely movable weighted closure shifted by the stem—or by the diaphragm—to open the passage. The gases trapped by closure of the gravity-controlled ball develop sufficient pressure to lift the ball and effect operation of the signalling means, the escape of gases past the valve causing an audible signal.

Having thus described my invention what I claim as new and desire to secure by Letters Patent is:

1. In a storage battery having a cell having a top wall provided with the usual screw-plug closed filling opening, a signalling element comprising a body designed for insertion in said opening in replacement of said plug, means providing for the escape through the body of gases developed in the cell during charging thereof, means for intermittently obstructing said escape means, means controlled by the cell electrolyte for maintaining said escape means unobstructed while the cell electrolyte is at a correct level and above a specified specific gravity, and means for effecting the production of a signal by the gases passing through said escape means when an undesirable condition develops in regard to the electrolyte and said obstructing means is alternately closing and opening said escape means.

2. In a secondary battery having a cell provided with a top wall having a plug closed filling opening, a body insertable in said filling opening and having an escape passage therethrough for gases developed in the cell while the same is receiving a charging current, a float element, a stem carried by the element and having one end extended into said passage for limited movement therein, a freely movable element in the passage and adapted to close the same when said stem is moved in one direction to have said end in a predetermined position in the passage, said stem being attached to said float and, when raised with the float by the electrolyte in the cell, shifting said freely movable element to open the passage, and means whereby gases escaping past said movable element as a result of built-up pressure in the cell, when the element is in passage closing position, will effect the production of an audible signal.

3. In an electrolyte containing storage battery having a cell provided with a top wall having a filling opening therethrough, a closure body for the filling opening having a chamber in its upper portion, means forming a part of the closure body constituting a whistle, means forming a gas escape passage leading from the interior of the cell to the whistle through which gases formed during charging of the cell may pass, a weighted closure means for the passage which, when operative, may be shifted to open the passage by the development of sufficient gas pressure within the cell, and float actuated means so constructed and arranged as to prevent said closure means closing the passage when electrolyte in the cell is at a predetermined height and above a predetermined specific gravity.

4. In a storage battery having an electrolyte containing cell provided with a top having a filling opening, a signalling device comprising a hollow body having an end formed to be secured in said opening, a member in the said end of the body having a passage therethrough for the escape into the body of gases developed in the cell in charging the same, the inner end of the passage being of enlarged diameter, said member at its inner end having a pocket into the center of which the enlarged end of the passage opens, a ball valve in said pocket and adapted to enter by gravity into the said enlarged end of the passage, the ball when in the passage resisting the escape of gases from the cell, means forming a part of the body whereby gases escaping through said passage past said valve will effect production of an audible signal, a float adapted to be floated by the electrolyte when the specific gravity reaches a predetermined figure, and a stem carried by the float and having an end extending into said passage and terminating in the enlarged end thereof, said stem operating when the float is raised by the electrolyte to shift the ball valve to open the passage.

5. In a storage battery having an electrolyte containing cell provided with a top wall having a filling opening, a removable closure for the filling opening, said closure having a gas escape passageway therethrough leading from the interior of the cell, signalling means carried by the closure, a gravity controlled element adapted to close said passageway and to be shifted by the pressure of gases developed in the cell as a result of the charging of the same, the said gases, when under sufficiently developed pressure to force the element from the passageway closing position, effecting the operation of the signalling means, a float adapted to be raised by the electrolyte in the cell when the electrolyte specific gravity reaches a predetermined value, and means connected with the float for effecting the movement of said element from the passageway closing position when the electrolyte level is at a predetermined height and the specific gravity is at said value.

6. In a secondary battery having an electrolyte containing cell provided with a top wall having a filling opening normally closed by a plug, a body consisting of a hollow member having one end adapted to be secured in said opening, the other end of the member being closed, means forming a gas escape passage through said one end of the member, a ball valve adapted to seat in the upper end of said passage, said ball valve being gravity operated to close the passage when the electrolyte level is low or its specific gravity is below a predetermined degree, the gases developed in the cell in the process of charging shifting the valve and passing into said member, means forming a part of the member by which the gases pass to the outside thereof whereby such gases escaping past said valve into the member will produce an audible signal, a float body contacting the electrolyte and raised thereby when the specific gravity exceeds a predetermined figure, a stem having one end extended into said passage and adapted when raised to a predetermined position with and by the float to lift said ball valve to open the passage, and the other end of the stem being connected to the float.

7. A signal device for a secondary battery, comprising a hollow body having an outlet opening, means for securing the body in an opening in the top of a battery cell with the outlet opening above the cell top, the body having a passage arranged to lead thereinto from inside the cell, a float member designed to be supported by the cell electrolyte when the latter has a specific gravity above a predetermined figure, a stem carried by the float and having an end extended into said passage, a gravity-actuated valve element adapted to close the passage when the stem and float are lowered a predetermined distance to confine gases developed in charging the cell whereby pressure is built up beneath the element, means in the body co-acting with the outlet opening to effect development of a signalling sound when a volume of gas passes rapidly through the passage, the body and the outlet opening, and said stem being of the necessary length to engage and prevent the valve closing the passage when raised with the float as the latter is raised to the top of the electrolyte when the electrolyte is at a predetermined level and has the said predetermined specific gravity.

8. In a storage battery, a whistle having an inlet from the battery, a sloping valve seat surrounding the inlet, a ball resting on the seat, a ball-lift adapted to hold the ball from its seat and means operating the lift and dipping into the electrolyte to apply buoyancy from the electrolyte to operate the ball-lift, whereby failure of buoyancy from loss of level or lowering specific gravity of the electrolyte, permits the ball to seat, for subsequent intermittent opening by the battery gases generated during battery charging, with sudden intermittent discharges operating the whistle.

9. In a battery signal, a hollow plug adapted to fit into the filling opening of a battery, a whistle carried by the plug, connected with a passage through the plug and adapted to be sounded with a considerable volume of gas outlet to the whistle and not to be sounded with gradual discharge of gas from the electrolyte through the whistle, a gravity operated valve adapted to be opened by gas pressure but otherwise closing the passage to the whistle, a float in the electrolyte and a stem carried by the float and engaging the valve whereby with normal electrolyte level in the battery the valve is held open allowing gradual discharge through the whistle, and with low battery level the valve is allowed to close subject to pressure of gas given off by the electrolyte.

10. For use in a battery having a filling opening, an apertured plug, a whistle in the upper part of the plug and connected to the battery by a passage, a gravity actuated ball valve within the lower part of the plug, adapted to close the passage, the bottom of the passage always being open to the interior of the battery, a tubular lower skirt for the plug, a diaphragm across the tubular skirt closing its lower end, a support for the diaphragm and a stem from the diaphragm engaging the ball of the valve to lift it with pressure upwardly on the diaphragm.

11. In a storage battery, a whistle having an inlet from the battery for venting the battery gases through the whistle, a gravity-operated valve adapted to close the inlet, a flexible diaphragm, a support for the diaphragm holding it in position to engage the valve and open it, while permitting gas flow outwardly from the battery when the valve is open and a downward peripheral skirt extending from the diaphragm into the electrolyte effective to trap gases under the diaphragm and open the valve.

12. For use in a storage battery having a filling opening, an apertured plug body adapted to fit the opening, a pressure-operated sound alarm forming a battery outlet from the upper part of the battery, communicating through the plug body with the interior of the battery, a partition across interior of the body and having a valve opening, a gravity closed ball adapted to close the valve opening and thus close the aperture, tubular means connected with the body immersible in the electrolyte of the battery and a diaphragm responsive to pressure in the tubular means engaging the ball when the electrolyte is high and lifted to open the valve by air trapped in the tubular means, the lower part of the valve opening being at all times in free communication with the interior of the battery.

13. For use in a battery having a filling opening, an apertured plug comprising a whistle top section and an intermediate plug body fitting the opening, a partition having a valve opening therein below the whistle, a gravity closed valve element adapted to close the valve opening and thus close the aperture and capable of being opened by gas pressure and fluid-pressure-operated means responsive to the changes in height of the electrolyte in the battery adapted to engage the valve element and open the valve for free outward passage when the electrolyte level is raised.

14. For use in a filling opening of a battery, a plug closure for the battery opening apertured from the outside of the battery to the inside thereof having a gravity actuated ball valve at an intermediate point in the aperture, a whistle above the valve communicating therewith, a valve seat for the valve, the bottom of the seat opening being in communication with the interior of the battery, a diaphragm below the valve adapted to engage and lift the ball to open the valve when the electrolyte level is high and a tubular skirt below and sealed to the diaphragm, immersible in the electrolyte and adapted to develop pressure within the skirt acting upon the diaphragm and to an extent dependent upon the extent of immersion within the electrolyte.

15. For use in a battery having a filling opening, an apertured plug body, a whistle above the plug body and connected with the interior of the body by a passage, a gravity actuated ball valve within the lower part of the body adapted to close the passage, a diaphragm across the lower part of the plug body and adapted to be lifted into engagement with the ball of the valve to open the valve, a tubular lower skirt extending from the body and a resilient support for the diaphragm frictionally held in the tubular skirt by expansion against the skirt walls, the aperture being open to the interior of the battery above the diaphragm when the ball has been lifted.

LELAND ROSS WILLITS.